United States Patent
Sakuma et al.

(10) Patent No.: US 8,209,177 B2
(45) Date of Patent: Jun. 26, 2012

(54) VOICE RECOGNITION SYSTEM HAVING ARTICULATED TALK-BACK FEATURE

(75) Inventors: Kazunori Sakuma, Fukushima (JP); Nozomu Saito, Fukushima (JP); Tohru Masumoto, Fukushima (JP)

(73) Assignee: Alpine Electronics, Inc., Tokyo (JP)

( * ) Notice: Subject to any disclaimer, the term of this patent is extended or adjusted under 35 U.S.C. 154(b) by 743 days.

(21) Appl. No.: 12/327,209

(22) Filed: Dec. 3, 2008

(65) Prior Publication Data

US 2009/0187406 A1 Jul. 23, 2009

(30) Foreign Application Priority Data

Jan. 17, 2008 (JP) .................................. 2008-007673

(51) Int. Cl.
*G10L 15/04* (2006.01)
(52) U.S. Cl. ...................................................... 704/253
(58) Field of Classification Search .................... 704/253
See application file for complete search history.

(56) References Cited

U.S. PATENT DOCUMENTS
2004/0260549 A1 12/2004 Matsumoto et al.

FOREIGN PATENT DOCUMENTS
JP 11-175082 7/1999
JP 2005-037423 2/2005

*Primary Examiner* — Susan McFadden
(74) *Attorney, Agent, or Firm* — Brinks Hofer Gilson & Lione (57) ABSTRACT

A voice recognition system is provided that outputs a talk-back voice in a manner such that a user can distinguish the accuracy of a voice-recognized character string more easily. A voice recognition unit performs voice recognition on a user's articulation in which a character string such as the telephone number "024 636 0123" is entered via a microphone. Based on each "sound existing period delimited by silent intervals," each recognized partial character string "024", "636" and "0123" is obtained. A talk-back voice data generating unit connects each recognized partial character string "024", "636" and "0123" together in a manner such that space characters are inserted, and generates a character string "024 636 0123". The generated character string "024 636 0123" is supplied to a voice generating device as talk-back voice data. A voice signal to be produced by the speaker is generated in the form of the talk-back voice.

13 Claims, 6 Drawing Sheets

FIG. 4 (a1) RECOGNIZED PARTIAL CHARACTER STRING
FIG. 4 (a2) TALK-BACK VOICE DATA
FIG. 4 (a3) TALK-BACK VOICE
FIG. 4 (b1) IS "024 636 0123" CORRECT?
FIG. 4 (b2) IS "024-636-0123" CORRECT?

VOICE RECOGNITION SYSTEM HAVING ARTICULATED TALK-BACK FEATURE

RELATED APPLICATIONS

The present application claims priority to Japanese Patent Application Number 2008-007673, filed Jan. 17, 2008, the entirety of which is hereby incorporated by reference.

BACKGROUND OF THE INVENTION

1. Field of the Invention

The present invention relates to a technique for producing a talk-back voice in a voice recognition system.

2. Description of the Related Art

Conventionally, many voice recognition systems produce a talk-back voice which is used when a voice-recognized character string is read out for the purpose of confirming the voice-recognized character string based on the articulated voice of a user, or the like.

As a technique for producing a talk-back voice in such a voice recognition system, it is known to produce a talk-back voice in an accent similar to the accent in the articulated voice of the user (see Japanese Patent Application Publication No. 1999 (H11)-175082 and Japanese Patent Application Publication No. 2005-37423, for example).
With a character string such as a telephone number or a password in which characters are arbitrarily ordered, there may be cases in which the user has memorized the character string with delimiting points peculiar to the user. For example, there may be a case where he/she memorizes the format [area code]-[local office number]-[subscriber number] of a telephone number as 0246-36-0123 which is differently delimited from the actual format of 024-636-0123.

In this case, when the talk-back voice is a character string without delimiting points or with predetermined delimiting points, the user cannot easily distinguish the accuracy of a voice-recognized character string, because of the different delimiting points of the character string in the talk-back voice. For example, in the case of recognizing the telephone number 0246360123 which has been memorized by a user as 024-636-0123 as described above, when the talk-back voice is produced as "0246360123" without delimiting points or when the talk-back voice is produced as "0246 36 0123" with actual delimiting points based on the area code, the local office number and the subscriber number, the delimiting points of the telephone number that the user had memorized are different from the delimiting points of the telephone number in the talk-back voice. Accordingly, the user may feel uncertain in distinguishing the accuracy of the voice-recognized telephone number.

SUMMARY OF THE INVENTION

It is an object of the present invention to produce a talk-back voice in a manner such that a user can distinguish the accuracy of a voice-recognized character string more easily in a voice recognition system.

To achieve the above-described object, one embodiment of the present invention provides a voice recognition system that recognizes a character string spoken by a user and outputs a voice as a talk-back which reads out the voice-recognized character string, the system comprising: a voice recognition unit that voice-recognizes a character string spoken by the user; an articulation delimiting points detecting unit that detects a delimiting point of articulation in the character string spoken by the user; and a talk-back voice output unit that outputs a voice as the talk-back voice which reads out the character string recognized by the voice recognition unit in a manner such that the recognized character string is delimited at points corresponding to the delimiting points of articulation detected by the articulation delimiting points detecting unit.

According to such a voice recognition system, in a case where the user articulates a character string like a telephone number or a password with delimiting points peculiar to the user, the talk-back voice is a voice in accordance with the character string voice-recognized in the articulation, in other words, with delimiting points peculiar to the user. Therefore, the delimiting points that the user has memorized and the delimiting points in the talk-back voice coincide, and thereby the user can immediately distinguish the accuracy of the voice-recognized character string.

Specifically, in this type of voice recognition system, the talk-back voice output unit may output a voice as the talk-back voice which reads out the character string recognized by the voice recognition unit in a manner such that the character string is delimited by silent intervals at points in the recognized character string corresponding to the delimiting points of articulation detected by the articulation delimiting points detecting unit. Alternatively, the talk-back voice output unit may output a voice as the talk-back voice which reads out the character string recognized by the voice recognition unit in a manner such that the character string is delimited by a predetermined sound effect at points corresponding to the delimiting points of articulation detected by the articulation delimiting points detecting unit.

Further, in the above-described voice recognition system, the voice recognition unit may perform voice recognition for each articulation period of the user, which periods are delimited at delimiting points detected by the articulation delimiting points detecting unit, and set a voice-recognized character string for each articulation period as a partial character string. The talk-back voice output unit may output a voice which reads out the partial character strings, in the voice-recognized order, in a manner such that the character string is delimited into each partial character string.

Further, to achieve the above-described object, this embodiment provides a voice recognition system that recognizes a character string spoken by a user and outputs a voice as a talk-back voice which reads out the voice-recognized character string, the system comprising: a voice extracting unit that extracts the user's voice in each articulation period; a voice recognition unit that performs voice recognition for the user's voice in each articulation period which was extracted by the voice extracting unit, and sets a voice-recognized character string for each articulation period as a partial character string; and a talk-back voice output unit that outputs a voice which reads out, in the voice-recognized order, the partial character strings voice-recognized by the voice recognition unit in a manner such that the character string is delimited into each partial character string.

In this type of voice recognition system, in a case where the user articulates a character string like a telephone number or a password with delimiting points peculiar to the user, the talk-back voice is a voice in accordance with the character string voice-recognized in the articulation, in other words, with delimiting points peculiar to the user. Therefore, the delimiting points that the user has memorized and the delimiting points in the talk-back voice coincide, and thereby the user can immediately distinguish the accuracy of the voice-recognized character string.

The talk-back voice output unit may output a voice as the talk-back voice that reads out, in the voice-recognized order, each partial character string voice-recognized by the voice recognition unit in a manner such that the partial character strings are delimited by silent intervals. Alternatively, the talk-back voice output unit may output a voice as the talk-back voice which reads out, in the voice-recognized order, each partial character string voice-recognized by the voice recognition unit in a manner such that the partial character string is delimited by a predetermined sound effect.

In a voice recognition system comprising the articulation delimiting points detecting unit, it is also possible to provide a recognized character string display unit that displays the character string voice-recognized by the voice recognition unit in a manner that the character string is delimited at points in the recognized character string corresponding to delimiting points of articulation detected by the articulation delimiting points detecting unit, in place of the talk-back voice output unit or together with the talk-back voice output unit. Also, in the voice recognition system equipped with the voice extracting unit, it is preferable to provide a recognized character string display unit that displays the partial character strings voice-recognized by the voice recognition unit in a manner that the character string is delimited by each partial character string, in place of the talk-back voice output unit or together with the talk-back voice output unit.

According to these voice recognition systems, in a case where the user articulates a character string like a telephone number or a password with delimiting points peculiar to the user, a character string is displayed in accordance with the character string voice-recognized in the articulation, in other words, with delimiting points peculiar to the user. Therefore, the delimiting points that the user has memorized and the delimiting points in the displayed character string coincide, and thereby the user can immediately distinguish the accuracy of the voice-recognized character string.

The above-described voice recognition systems can be applied as a voice input device to a navigation system. Specifically, in this case, an on-vehicle system can comprise the voice recognition system and a navigation system that presents, to a user on a map, a position identified by the character string voice-recognized by the voice recognition system.

As described above, according to the present invention, the voice recognition system can output a talk-back voice in a manner such that the user can distinguish the accuracy of a voice-recognized character string more easily.

DETAILED DESCRIPTION OF THE PREFERRED EMBODIMENTS

An application of an embodiment of the present invention to an on-vehicle system mounted in an automotive vehicle will now be described as an example.

Figure 1:
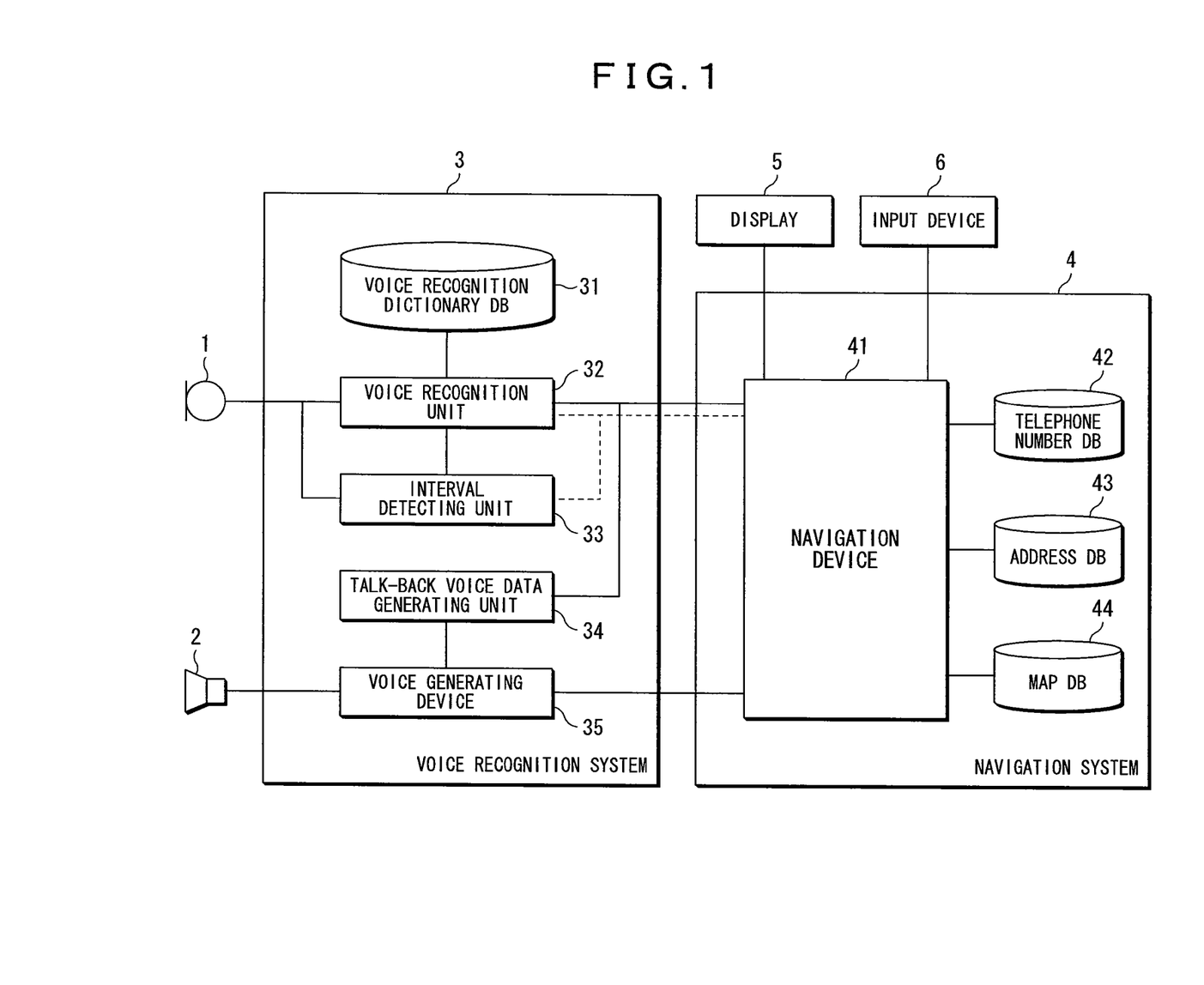
FIG. 1 is a block diagram of an on-vehicle system according to one embodiment of the present invention.

FIG. 1 is a block diagram of the on-vehicle system according to this embodiment. As shown in the drawing, the on-vehicle system according to this embodiment comprises a microphone 1, a speaker 2, a voice recognition system 3, a navigation system 4, a display 5, and an input device 6.

The voice recognition system 3 is equipped with: a voice recognition dictionary database 31 in which a voice recognition dictionary is stored; a voice recognition unit 32 that performs voice recognition on the articulated voice of a user received at the microphone 1 by using the voice recognition dictionary stored in the voice recognition dictionary DB; an interval detecting unit 33 that detects silent intervals of the articulated voice of the user received at the microphone 1; a talk-back voice data generating unit 34 that generates talk-back voice data representing a talk-back voice that reads out a character string recognized by the voice recognition unit 32 from the articulated voice of a user; and a voice generating device 35 that generates a voice represented by the talk-back voice data, which was generated by the talk-back voice data generating unit 34, and outputs the voice from the speaker 2.

The navigation system 4 comprises: a navigation device 41; a telephone number database 42 that stores an association between each telephone number and its address point coordinates among subscribed telephone numbers; an address database 43 that stores an association between each address and point coordinates of the address; and a map database 44 in which map data is stored.

In the above-described on-vehicle system, the navigation device 41 and the voice recognition system 3 may be implemented in a computer comprising a general constitution having a microprocessor, a memory and other peripheral devices in terms of hardware. In this case, each unit of the navigation device 41 or the voice recognition system 3 described above may be realized as a process by executing a previously prepared program on the microprocessor. Further, in this case, such a program may be supplied to the on-vehicle system through the recording medium or an appropriate communication path.

The navigation device 41, by using a built-in GPS receiver or various dead reckoning systems, performs processing for calculating a present position while referring to map data, and generating a guidance image in which the calculated present position is displayed on a map represented by the map data to display the image on the display 5. Further, the navigation device 41 performs processing for accepting a destination set by the user, searching a recommended route from the present position to the accepted destination based on the map data, and providing guidance for the searched route via the guidance image displayed on the display 5 or by providing voice guidance for the route via the voice generating device 35.

Further, the navigation device 41 performs a point search or setting of a destination based on telephone numbers or addresses entered by a user. Specifically, the navigation device 41, when a telephone number is entered by the user, acquires the coordinates corresponding to the entered telephone number registered with the telephone number database 42, and sets the acquired coordinates as search result point coordinates or destination coordinates. Similarly, the navigation device 41, when an address is entered by the user, acquires the address corresponding to the entered address registered with the address database 43, and sets the acquired coordinates as search result point coordinates or destination coordinates.

Furthermore, the navigation device 41 accepts these telephone number and address inputs through the input device 6 as well as by voice input. Specifically, the navigation device 41, when a user requests the voice input of a telephone number or an address, instructs the voice recognition unit 32 and the interval detecting unit 33 to start voice recognition via the input device 6. Then, the voice recognition unit 32 accepts a character string recognized based on the articulated voice of the user as a temporarily-entered character string. When approval of a voice recognition result based on the string is entered through user's direct operation or by voice input to the input device 6, the device accepts the temporarily-entered character string as an entered telephone number or address, and performs a point search or destination setting based on the input as described above.

Now, the operation of the voice recognition system 3 in this on-vehicle system will be described.

In the voice recognition system 3, the interval detecting unit 33, when the start of voice recognition is instructed by the navigation device 41, starts monitoring a voice signal received by the microphone 1. The interval detecting unit 33 outputs an interval detection signal to the voice recognition unit 32 when a shift from a sound existing period of a voice signal to a silent interval having a first predetermined time length (0.2 second, for example) or more occurs. Further, when a silent interval having a second predetermined time length (1 second, for example) or more occurs, the interval detecting unit 33 outputs a recognition end signal to the voice recognition unit 32. Then, the monitoring of voice signal received by the microphone 1 ends.

Figure 2A:
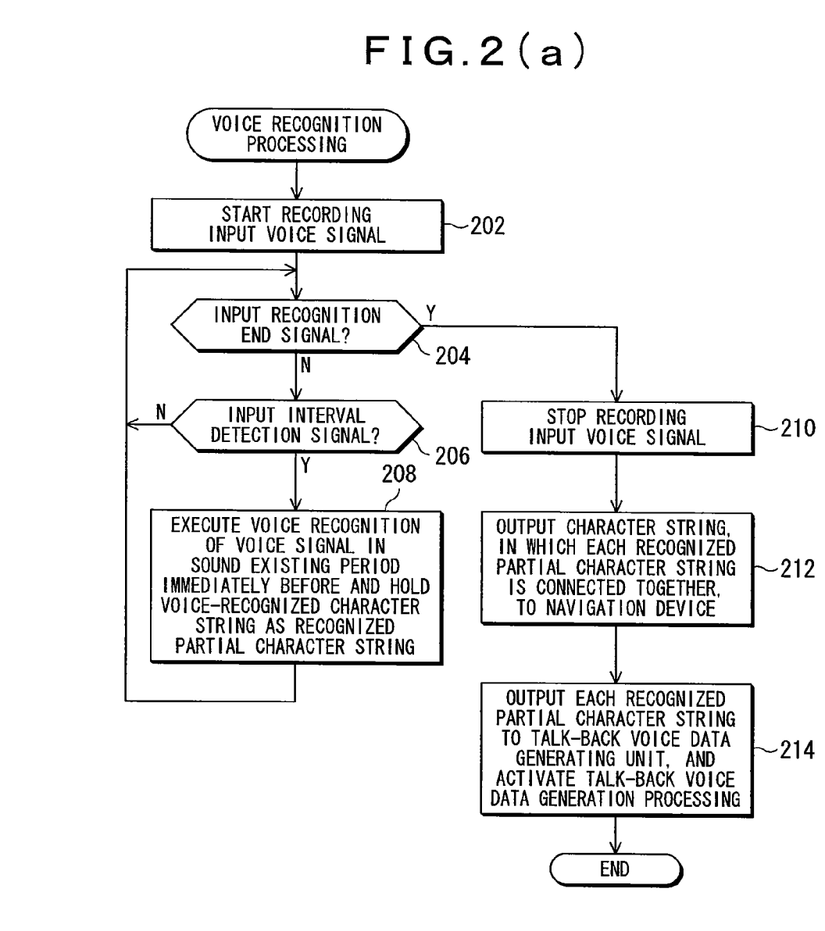
FIG. 2 is a flowchart showing processes performed by the voice recognition system according to the embodiment of the present invention.

On the other hand, in the voice recognition system 3, the voice recognition unit 32, when the start of voice recognition is instructed by the navigation device 41, starts the voice recognition processing shown in FIG. 2(*a*).

Specifically, in the voice recognition processing, the voice recognition unit 32 starts recording voice signals received by the microphone 1 (step 202). Then, when the interval detection signal is supplied by the interval detecting unit 33 (step 206), the unit performs voice recognition on an immediately preceding sound existing period in the recorded voice signals while referring to the voice recognition dictionary, and holds the voice-recognized character string as a recognized partial character string (step 208). Further, when the recognition end signal is supplied from the interval detecting unit 33 (step 204), the unit stops recording voice signals (step 210), and passes a character string to the navigation device 41 as a character string recognized based on the articulated voice of the user, in a manner such that each of the held recognized partial character strings are connected together in the voice-recognized order (step 212). Further, the unit outputs each of the held recognized partial character strings in the voice-recognized order to the talk-back voice data generating unit 34, instructs the talk-back voice data generating unit 34 to activate talk-back voice data generation processing (step 214), and ends the voice recognition processing.

The navigation device 41 accepts the character string passed from the voice recognition unit 32, in which the recognized partial character strings are connected together, as a temporarily-entered character string as described above.

Figure 2B:
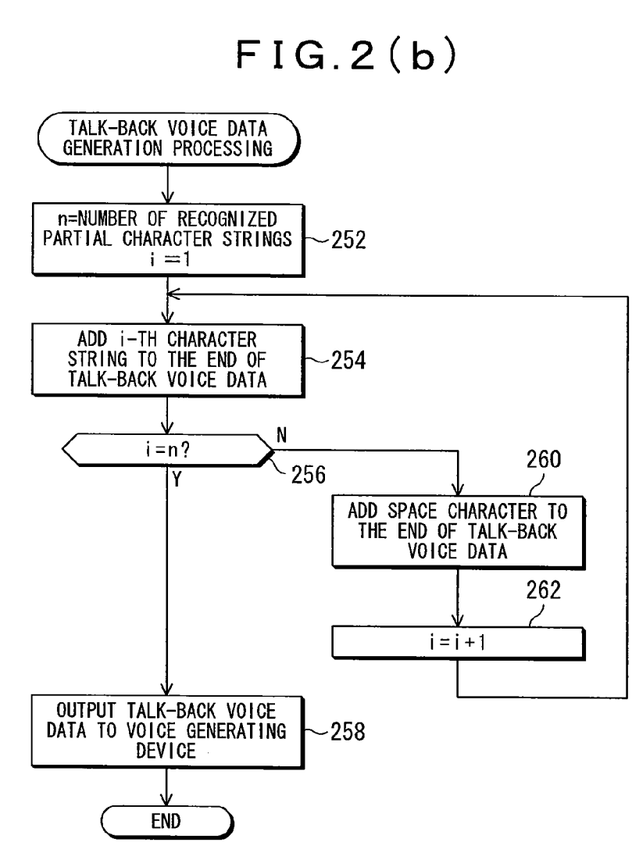

The talk-back voice data generating unit 34, when the activation of the talk-back voice data generation processing is instructed, performs talk-back voice data generation processing as shown in FIG. 2(*b*). As shown in the drawing, in this process, a character string is generated in which each recognized partial character string from the voice recognition unit 32 is connected together (step 254) in the voice-recognized order in such a manner that a space character is inserted in-between (step 260) and the generated character string is supplied to the voice generating device 35 as talk-back voice data (step 258).

Then, the voice generating device 35 generates a voice signal which represents a voice that reads out the character string represented by the talk-back voice data, and outputs the signal in the form of the talk-back voice via the speaker 2. The voice generating device 35 outputs a silent voice signal for a predetermined period for the space characters in the character string.

Figure 3:
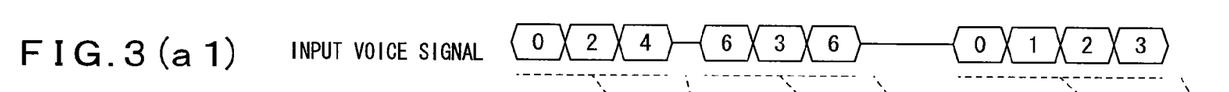
FIG. 3 illustrates an example of how the talk-back voice according to the embodiment of the present invention is generated.

As a result, in the case where the user articulated a telephone number with an actual format [area code]-[local office number]-[subscriber number] of 0246-36-0123 while delimiting the telephone number at intervals between 024 and 636 and between 636 and 0123 (that is, "024 636 0123") an entered voice signal received by the microphone 1 is as shown in FIG. 3(*a*1). The interval detecting unit 33 outputs an interval detection signal between 024 and 636, between 636 and 0123, and immediately after 0123 of the entered voice signal as shown in FIG. 3(*a*2). Further, the interval detecting unit 33 outputs a recognition end signal after a predetermined period following the articulation of 0123 of the entered voice signal.

As shown in FIG. 3(*a*3), the voice recognition unit 32 recognizes a partial character string "024" in a sound existing period immediately before the interval detection signal that is output between 024 and 636, recognizes a partial character string "636" in a sound existing period immediately before the interval detection signal that is output between 636 and 0123, and recognizes a partial character string "0123" in a sound existing period immediately before the interval detection signal that is output immediately after 0123.

When the recognition end signal is generated after the predetermined period following the articulation of 0123 of the entered voice signal, a character string "0246360123" in which each recognized partial character string is connected together is supplied to the navigation device 41, and each recognized partial character string "024", "636" and "0123" is supplied to the talk-back voice data generating unit 34.

The talk-back voice data generating unit 34 connects together each recognized partial character string "024", "636" and "0123", which is received from the voice recognition unit 32, as shown in FIG. 3(*b*1) in a manner such that space characters are inserted as shown in FIG. 3(*b*2), and generates a character string "024 636 0123". Then, the unit outputs the generated character string "024 636 0123" to the voice generating device 35 as talk-back voice data. The voice generating device 35 generates a voice signal representing a voice that reads out the character string "024 636 0123" represented by the talk-back voice data as shown in FIG. 3(*b*3), and outputs the signal in the form of a talk-back voice via the speaker 2. As shown in the drawing, the voice generating device 35 outputs a silent voice signal for a predetermined period for the space characters in the character string.

According to the above-described embodiment, in a case where the user articulates a character string like a telephone number with delimiting points peculiar to the user, a talk-back voice is generated in accordance with the character string voice-recognized in the articulation, in other words, with delimiting points peculiar to the user. Therefore, the delimiting points that the user has memorized and the delimiting points in the talk-back voice coincide, and the user can thereby immediately distinguish the accuracy of the voice-recognized character string.

In the embodiment above, by setting a character string in which each partial character string recognized by the voice recognition unit 32 is connected together in a manner such that space characters are inserted in-between as talk-back voice data, the talk-back voice data generating unit 34 generates intervals (silent intervals) in the talk-back voice at the points corresponding to the intervals in the user's articulation. Alternatively, in the talk-back voice, a period with a predetermined sound effect may be generated at the points corresponding to the intervals in the user's articulation, in place of the silent intervals.

Figure 4:
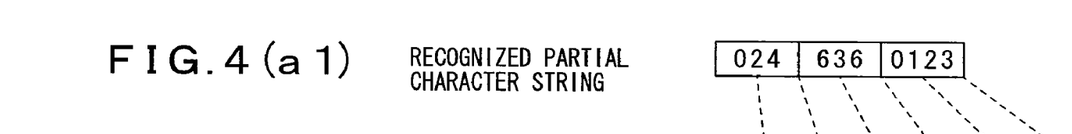
FIG. 4 illustrates an example of how the talk-back voice according to the embodiment of the present invention is generated.

Specifically, in this case, the talk-back voice data generating unit 34 connects each partial character string "024", "636" and "0123" recognized by the voice recognition unit 32 as shown in FIG. 4(*a*1) in a manner such that commands are inserted as shown in FIG. 4(*a*2), for example, and generates a character string "024 636 0123". The generated character string "0246360123" is supplied to the voice generating device 35 as talk-back voice data. Then, the voice generating device 35 generates a voice signal representing a voice that reads out the character string "0246360123" represented by the talk-back voice data as shown in FIG. 3(*a*3), and outputs the signal in the form of a talk-back voice via the speaker 2. As shown in the drawing, the voice generating device 35 outputs a voice signal with a predetermined sound effect ("Pi" in the drawing) for the commands in, the character string.

Further, the on-vehicle system according to this embodiment may be configured such that a voice-recognized character string is displayed on the display 5 in a manner such that the character string is delimited at points in the recognized character string corresponding to delimiting points of articulation, in place of producing the talk-back voice or together with producing the talk-back voice. Specifically, in this case, the voice recognition unit 32, when the recognition end signal is generated by the interval detecting unit 33, for example, passes each of the held recognized partial character strings to the navigation device 41 in the voice-recognized order. Then, the navigation device 41 displays each recognized partial character string passed from the voice recognition unit 32 on the display 5 in a manner such that the string is delimited by a space, a hyphen or another reference code as shown in FIG. 4(*b*1) or FIG. 4(*b*2).

Thus, in a case where the user articulates a character string like a telephone number with delimiting points peculiar to the user, a character string is displayed on the display 5 in accordance with the character string voice-recognized in the articulation, in other words, with delimiting points peculiar to the user. Therefore, the delimiting points that the user has memorized and the delimiting points in the displayed character string coincide, and the user can thereby immediately distinguish the accuracy of the voice-recognized character string.

Figure 5:
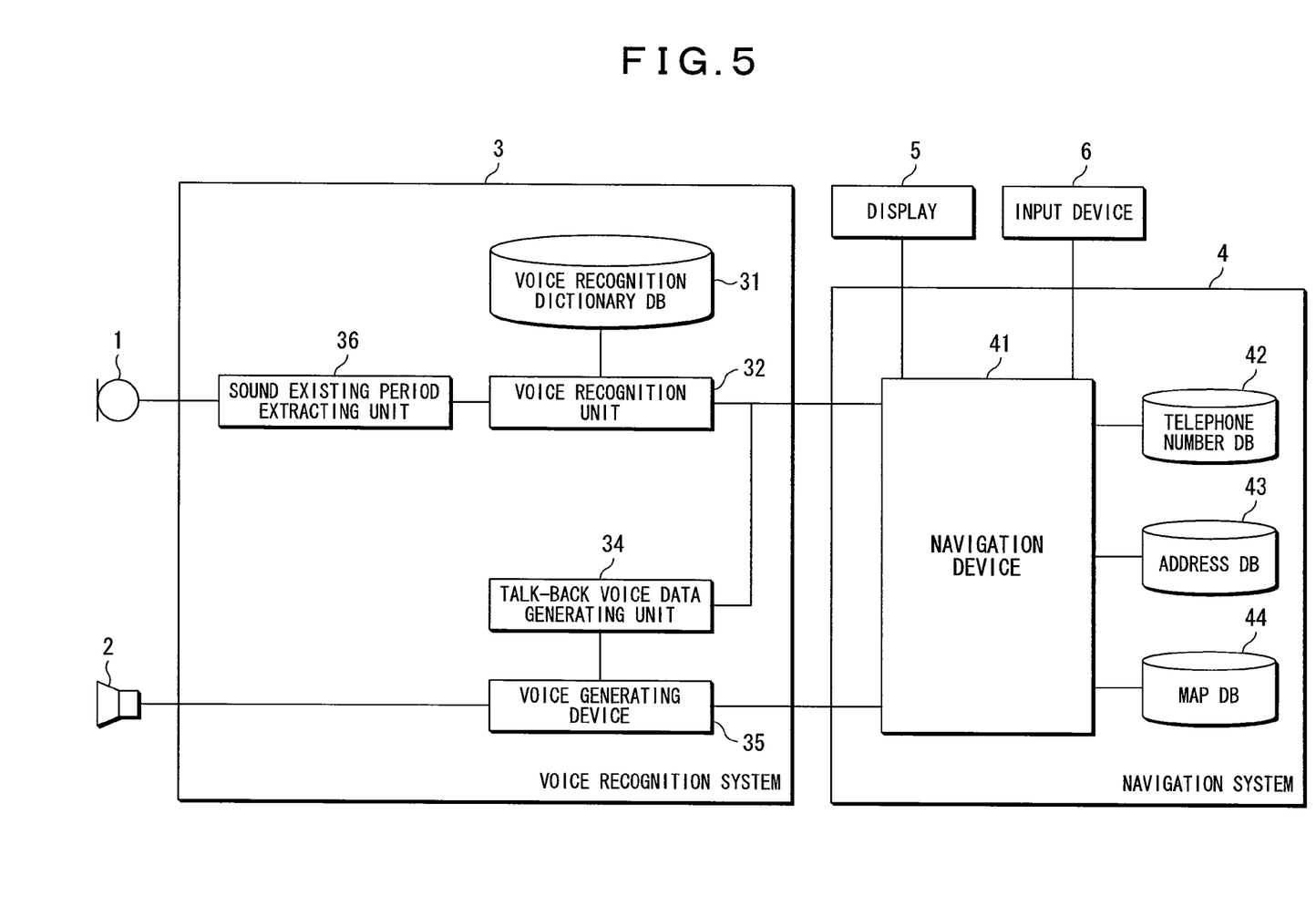
FIG. 5 is a block diagram of another configuration of the voice recognition system according to the embodiment of the present invention.

Alternatively, the on-vehicle system may be configured as shown in FIG. 5. As shown in the drawing, this on-vehicle system provides a sound existing period extracting unit 36 in place of the interval detecting unit 33 in the configuration of the on-vehicle system shown in FIG. 1.

In this configuration, when the start of voice recognition is instructed by the navigation device 41, the sound existing period extracting unit 36 starts recording and monitoring voice signals received by the microphone 1, detects a sound existing period in voice signals received by the microphone 1, and every time a sound existing period is detected, extracts a voice signal received by the microphone 1 in the detected sound existing period as a sound existing period signal out of recorded voice signals, and outputs the signal to the voice recognition unit 32. Further, when a silent period with a predetermined time length (1 second, for example) or more occurs, the sound existing period extracting unit 36 supplies a recognition end signal to the voice recognition unit 32. Then, the sound existing period extracting unit 36 stops monitoring voice signals received by the microphone 1.

In the voice recognition system 3, when the start of voice recognition is instructed by the navigation device 41, the voice recognition unit 32, every time a sound existing period signal is received from the sound existing period extracting unit 36, performs voice recognition on the sound existing period signal while referring to the voice recognition dictionary, and holds the voice-recognized character string as a recognized partial character string. When the recognition end signal is supplied by the sound existing period extracting unit 36, the unit passes a character string in which each of the recognized partial character string are connected together in the voice-recognized order, to the navigation device 41 as a character string recognized based on the articulated voice of a user. Further, the unit supplies each of the recognized partial character strings, in the voice-recognized order, to the talk-back voice data generating unit 34, instructs the talk-back voice data generating unit 34 to activate a talk-back voice data generation processing, and stops the voice recognition processing.

The talk-back voice data generating unit 34, when the activation of talk-back voice data generation processing is instructed, generates a character string in which each recognized partial character string supplied by the voice recognition unit 32 is connected together in the voice-recognized order in a manner such that space characters are inserted in-between, and outputs the generated character string to the voice generating device 35 as talk-back voice data.

Then, the voice generating device 35 generates a voice signal, which represents a voice that reads out a character string represented by the talk-back voice data, and outputs the signal from the speaker 2. The voice generating device 35 outputs a silent voice signal for a predetermined period for the space characters in the character string.

Figure 6:
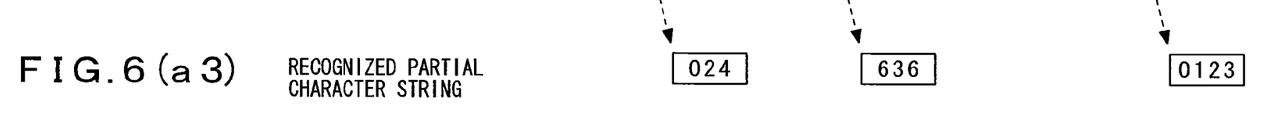
FIG. 6 illustrates an example of how the talk-back voice according to an embodiment of the present invention is generated.

As a result, in the case where the user articulates a telephone number with an actual format [area code]-[local office number]-[subscriber number] of 0246-36-0123 delimited by intervals between 024 and 636 and between 636 and 0123, that is, "024 636 0123," for example, an entered voice signal received by the microphone 1 is as shown in FIG. 6(*a*1). The sound existing period extracting unit 36 extracts each of the voice period of 024, the voice period of 636, and the voice period of 0123 in the entered voice signal as a sound existing period signal as shown in FIG. 6(*a*2), and outputs the voice period in the form of the signal to the voice recognition unit 32. Further, the sound existing period extracting unit 36 outputs the recognition end signal after a predetermined period Th following the articulation of 0123 represented by the entered voice signal.

As shown in FIG. 6(*a*3), the voice recognition unit 32 recognizes a partial character string "024" for the sound existing period signal of 024, recognizes a partial character string "636" for the sound existing period signal of 636, and recognizes a partial character string "0123" for the sound existing period signal of 0123.

When the recognition end signal is generated after a predetermined period Th following articulating 0123 of the entered voice signal, a character string "0246360123" formed by connecting each recognized partial character string is supplied to the navigation device 41, and each recognized partial character string "024", "636" and "0123" is supplied to the talk-back voice data generating unit 34.

The talk-back voice data generating unit 34 connects each recognized partial character string "024", "636" and "0123"

together, which is received from the voice recognition unit 32 as shown in FIG. 6(*b*1) in a manner such that space characters are inserted as shown in FIG. 6(*b*2), and generates a character string "024 636 0123". Then, the unit outputs the generated character string "024 636 0123" to the voice generating device 35 as talk-back voice data.

The voice generating device 35 generates a voice signal representing a voice that reads out the character string "024 636 0123" represented by the talk-back voice data, as shown in FIG. 6(*b*3), and outputs the signal in the form of a talk-back voice via the speaker 2. As shown in the drawing, the voice generating device 35 outputs a silent voice signal for a predetermined period for the space characters in the character string.

In the on-vehicle system as in FIG. 5, the talk-back voice data generating unit 34 may generate talk-back voice data in a manner such that a voice period with a predetermined sound effect occurs in place of the silent period where the user puts an interval in the articulation described above, as shown in FIG. 4(*a*2), for example.

Further, in the on-vehicle system as in FIG. 5, the system may display the voice-recognized character string on the display 5 in place of producing a talk-back voice or together with producing a talk-back voice in a manner such that the string is delimited by the intervals corresponding to the intervals in the user's articulation as described above, as shown in FIGS. 4(*b*1) and 4(*b*2), for example.

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims.

What is claimed is:

1. A voice recognition and talk-back system comprising:
   a voice recognition unit configured to recognize a character string spoken by a user;
   an articulation delimiting points detecting unit configured to detect a delimiting point of articulation in the character string spoken by the user; and
   a talk-back voice output unit configured to output a voice, which reads out the character string recognized by the voice recognition unit in a manner such that the recognized character string is delimited at points corresponding to the delimiting points of articulation detected by the articulation delimiting points detecting unit, as the talk-back voice.

2. The system according to claim 1, wherein
   said talk-back voice output unit outputs a voice, which reads out the character string recognized by said voice recognition unit in a manner such that the character string is delimited by silent intervals at points in the recognized character string corresponding to the delimiting points of articulation detected by said articulation delimiting points detecting unit, as said talk-back voice.

3. The system according to claim 1, wherein
   said talk-back voice output unit outputs a voice, which reads out the character string recognized by said voice recognition unit in a manner such that the character string is delimited by a predetermined sound effect at points corresponding to the delimiting points of articulation detected by said articulation delimiting points detecting unit, as said talk-back voice.

4. The system according to claim 1, wherein
   said voice recognition unit performs voice recognition for each articulation period of the user, which is delimited at delimiting points detected by said articulation delimiting points detecting unit, and sets a voice-recognized character string for each articulation period as a partial character string, and
   said talk-back voice output unit outputs a voice which reads out, in the voice-recognized order, said partial character strings in a manner such that the character string is delimited into each partial character string.

5. The system according to claim 4, wherein
   said talk-back voice output unit outputs a voice which reads out, in the voice-recognized order, said partial character strings in a manner such that the string is delimited by silent intervals.

6. The system according to claim 4, wherein
   said talk-back voice output unit outputs a voice which reads out, in the voice-recognized order, said partial character strings in a manner such that the string is delimited by a predetermined sound effect.

7. The system according to claim 1, further comprising:
   a recognized character string display unit that displays the character string recognized by said voice recognition unit in a manner such that the string is delimited at points corresponding to the delimiting points of articulation detected by said articulation delimiting points detecting unit.

8. An on-vehicle system, comprising:
   the system according to claim 1; and
   a navigation system that identifies a position on a map corresponding to the character string recognized by the voice recognition system.

9. A voice recognition and talk-back system, comprising:
   a voice recognition unit configured to recognize a character string spoken by a user;
   an articulation delimiting points detecting unit configured to detect a delimiting point of articulation in the character string spoken by the user;
   a talk-back voice output unit configured to output a voice, which reads out the character string recognized by the voice recognition unit in a manner such that the recognized character string is delimited at points corresponding to the delimiting points of articulation detected by the articulation delimiting points detecting unit, as the talk-back voice; and
   a recognized character string display unit that displays the character string recognized by said voice recognition unit in a manner such that the string is delimited at points corresponding to the delimiting points of articulation detected by said articulation delimiting points detecting unit.

10. A voice recognition and talk-back system comprising:
    a voice extracting unit configured to extract the user's voice in each of a plurality of articulation periods;
    a voice recognition unit configured to perform for the user's voice in each articulation period that was extracted by said voice extracting unit, and configured to set a voice-recognized character string for each articulation period as a partial character string; and
    a talk-back voice output unit configured to output a voice which reads out, in a voice-recognized order, the partial character strings recognized by the voice recognition unit in a manner such that the character string is delimited into each partial character string.

11. The system according to claim 10, wherein
said talk-back voice output unit outputs a voice which reads out, in the voice-recognized order, said partial character strings recognized by said voice recognition unit in a manner such that the partial character strings are delimited by silent intervals, as said talk-back voice.

12. The system according to claim 10, wherein
said talk-back voice output unit outputs a voice which reads out, in the voice-recognized order, said partial character strings recognized by said voice recognition unit in a manner such that the partial character strings are delimited by a predetermined sound effect, as said talk-back voice.

13. An on-vehicle system, comprising:
the system according to claim 10; and
a navigation system that identifies a position on a map corresponding to the character string recognized by the voice recognition system.

* * * * *